US010041255B2

(12) United States Patent
Houchin et al.

(10) Patent No.: US 10,041,255 B2
(45) Date of Patent: Aug. 7, 2018

(54) ROOFING MEMBRANES HAVING MULTIPLE ADHESIVE REGIONS AND METHOD THEREFOR

(71) Applicant: JOHNS MANVILLE, Denver, CO (US)

(72) Inventors: Jonas Houchin, Centennial, CO (US); Eric Alden Olson, Thornton, CO (US); Zebonie Sukle, Denver, CO (US); Bradley Robert Crume, Lakewood, CO (US); Richard F Gustin, Jr., Centennial, CO (US); Jordan Kortmeyer, Parker, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 15/364,526

(22) Filed: Nov. 30, 2016

(65) Prior Publication Data
US 2017/0081855 A1    Mar. 23, 2017

Related U.S. Application Data

(63) Continuation of application No. 14/831,637, filed on Aug. 20, 2015, now Pat. No. 9,540,821, which is a (Continued)

(51) Int. Cl.
*E04D 5/14* (2006.01)
*B32B 7/06* (2006.01)
(Continued)

(52) U.S. Cl.
CPC .............. *E04D 5/148* (2013.01); *B32B 3/266* (2013.01); *B32B 7/045* (2013.01); *B32B 7/06* (2013.01);
(Continued)

(58) Field of Classification Search
CPC .......... E04D 5/14; E04D 5/141; E04D 5/142; E04D 5/148; E04D 5/144; E04D 5/146; B32B 7/06; B32B 7/12; B32B 2419/06; B32B 2037/1253; B32B 2038/0076; B32B 2255/10; Y10T 428/1476
See application file for complete search history.

(56) References Cited

U.S. PATENT DOCUMENTS 4,421,807 A * 12/1983 Clausing ................... E04D 5/10
428/192
4,601,935 A * 7/1986 Metcalf ................... B32B 25/02
428/141
(Continued)

*Primary Examiner* — Andrew J Triggs
(74) *Attorney, Agent, or Firm* — Robert D. Touslee

(57) ABSTRACT

A roofing membrane may include a main body, a first material, and a second material. The first material may be bonded to the main body and positioned toward a first edge thereof. The second material may be bonded to the main body and positioned toward a second edge thereof. The second edge may be positioned opposite the first edge such that the first and second materials are positioned toward opposite edges of the main body. At least one of the first material or the second material may include a first reactive material of a chemically reactive two-part cure system that is configured to chemically react upon contact of the first reactive material with a second reactive material of the chemically reactive two-part cure system.

12 Claims, 7 Drawing Sheets

Related U.S. Application Data continuation-in-part of application No. 14/180,831, filed on Feb. 14, 2014, now Pat. No. 9,234,352.

(51) Int. Cl.

| | | |
|---|---|---|
| B32B 7/12 | (2006.01) | |
| B32B 7/04 | (2006.01) | |
| B32B 11/04 | (2006.01) | |
| B32B 11/06 | (2006.01) | |
| B32B 11/10 | (2006.01) | |
| B32B 15/14 | (2006.01) | |
| B32B 25/06 | (2006.01) | |
| B32B 25/08 | (2006.01) | |
| B32B 25/10 | (2006.01) | |
| B32B 27/08 | (2006.01) | |
| B32B 27/10 | (2006.01) | |
| B32B 27/12 | (2006.01) | |
| B32B 27/32 | (2006.01) | |
| B32B 3/26 | (2006.01) | |
| B32B 37/12 | (2006.01) | |
| B32B 38/00 | (2006.01) | |

(52) U.S. Cl.
CPC .............. *B32B 7/12* (2013.01); *B32B 11/046* (2013.01); *B32B 11/06* (2013.01); *B32B 11/10* (2013.01); *B32B 15/14* (2013.01); *B32B 25/06* (2013.01); *B32B 25/08* (2013.01); *B32B 25/10* (2013.01); *B32B 27/08* (2013.01); *B32B 27/10* (2013.01); *B32B 27/12* (2013.01); *B32B 27/32* (2013.01); *E04D 5/142* (2013.01); *E04D 5/144* (2013.01); *E04D 5/145* (2013.01); *E04D 5/146* (2013.01); *B32B 2037/1253* (2013.01); *B32B 2038/0076* (2013.01); *B32B 2255/10* (2013.01); *B32B 2255/26* (2013.01); *B32B 2307/712* (2013.01); *B32B 2307/748* (2013.01); *B32B 2419/06* (2013.01); *Y10T 428/1476* (2015.01)

(56) References Cited

U.S. PATENT DOCUMENTS

| | | | |
|---|---|---|---|
| 4,885,887 A | | 12/1989 | Simmons et al. |
| 5,242,736 A | | 9/1993 | Van Erden et al. |
| 5,309,685 A | | 5/1994 | Rathgerber et al. |
| 5,319,908 A | | 6/1994 | Van Erden et al. |
| 5,349,804 A | | 9/1994 | Van Erden et al. |
| 5,520,761 A | * | 5/1996 | Kalwara ............... A47L 13/16 156/157 |
| 5,593,748 A | | 1/1997 | Hubbard |
| 6,055,786 A | | 5/2000 | Hubbard et al. |
| 6,080,458 A | * | 6/2000 | Russell ............... C09J 7/00 428/354 |
| 6,233,889 B1 | | 5/2001 | Hulsey |
| 6,764,260 B1 | | 7/2004 | Nebesnak et al. |
| 7,198,220 B2 | | 4/2007 | Knowlton |
| 7,368,155 B2 | * | 5/2008 | Larson ............... E04D 5/10 428/141 |
| 7,430,837 B2 | | 10/2008 | Hubbard |
| 7,622,187 B2 | * | 11/2009 | Clarke ............... E04D 5/148 428/304.4 |
| 7,685,785 B2 | | 3/2010 | Johnson |
| 7,927,695 B2 | * | 4/2011 | Raulie ............... B32B 25/00 264/241 |
| 8,505,249 B2 | | 8/2013 | Geary |
| 8,709,565 B2 | * | 4/2014 | Kalwara ............... E04D 5/12 428/354 |
| 8,793,940 B2 | * | 8/2014 | Kalkanoglu ............... E04D 5/12 136/243 |
| 2006/0127627 A1 | * | 6/2006 | Larson ............... E04D 5/10 428/40.1 |
| 2006/0243388 A1 | * | 11/2006 | Kubiak ............... B32B 11/06 156/324 |
| 2011/0162791 A1 | | 7/2011 | Kalwara |
| 2012/0045623 A1 | | 2/2012 | Delaney et al. |
| 2012/0110931 A1 | * | 5/2012 | Eiffert ............... F24J 2/5237 52/173.3 |
| 2013/0022823 A1 | * | 1/2013 | Franks, Sr. ............ D06N 5/003 428/440 |
| 2013/0036694 A1 | * | 2/2013 | Brandt ............... B32B 5/18 52/309.1 |
| 2013/0295295 A1 | * | 11/2013 | Douglas ............... E04D 5/12 427/508 |
| 2014/0011008 A1 | * | 1/2014 | Letts ............... B32B 27/40 428/219 |
| 2014/0044935 A1 | * | 2/2014 | Miller ............... C08G 18/10 428/198 |
| 2017/0081855 A1 | * | 3/2017 | Houchin ............... B32B 7/06 |

\* cited by examiner

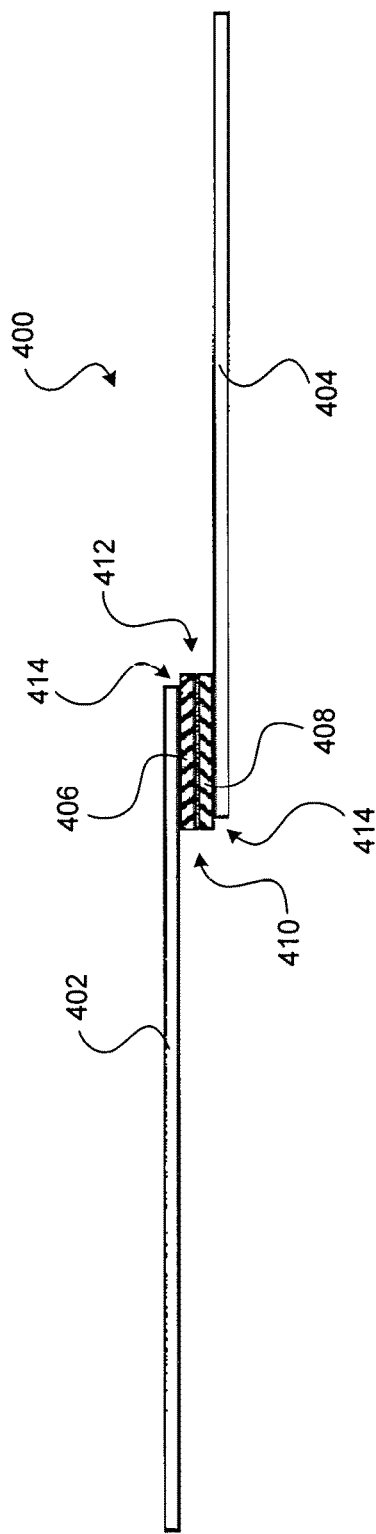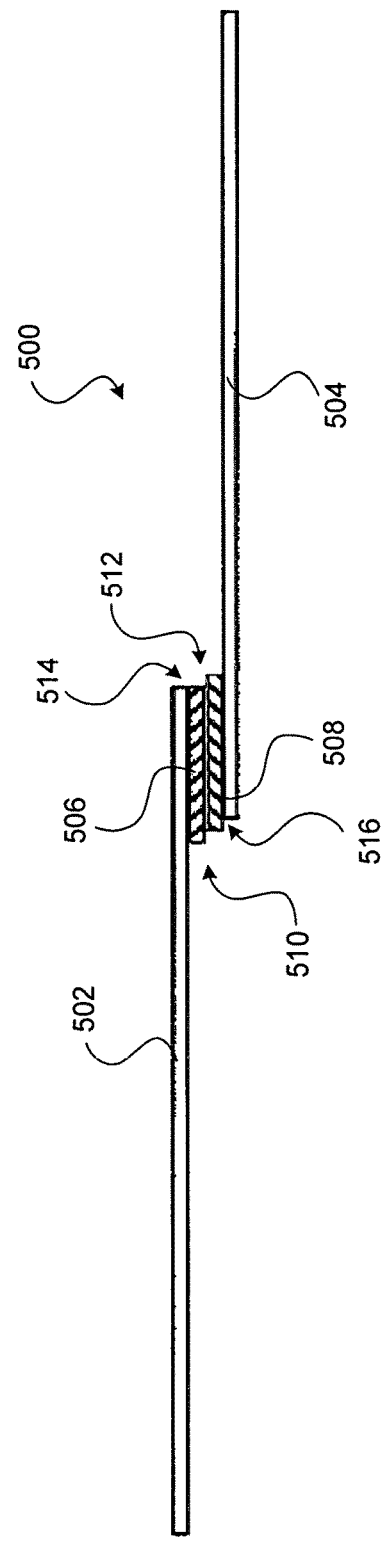

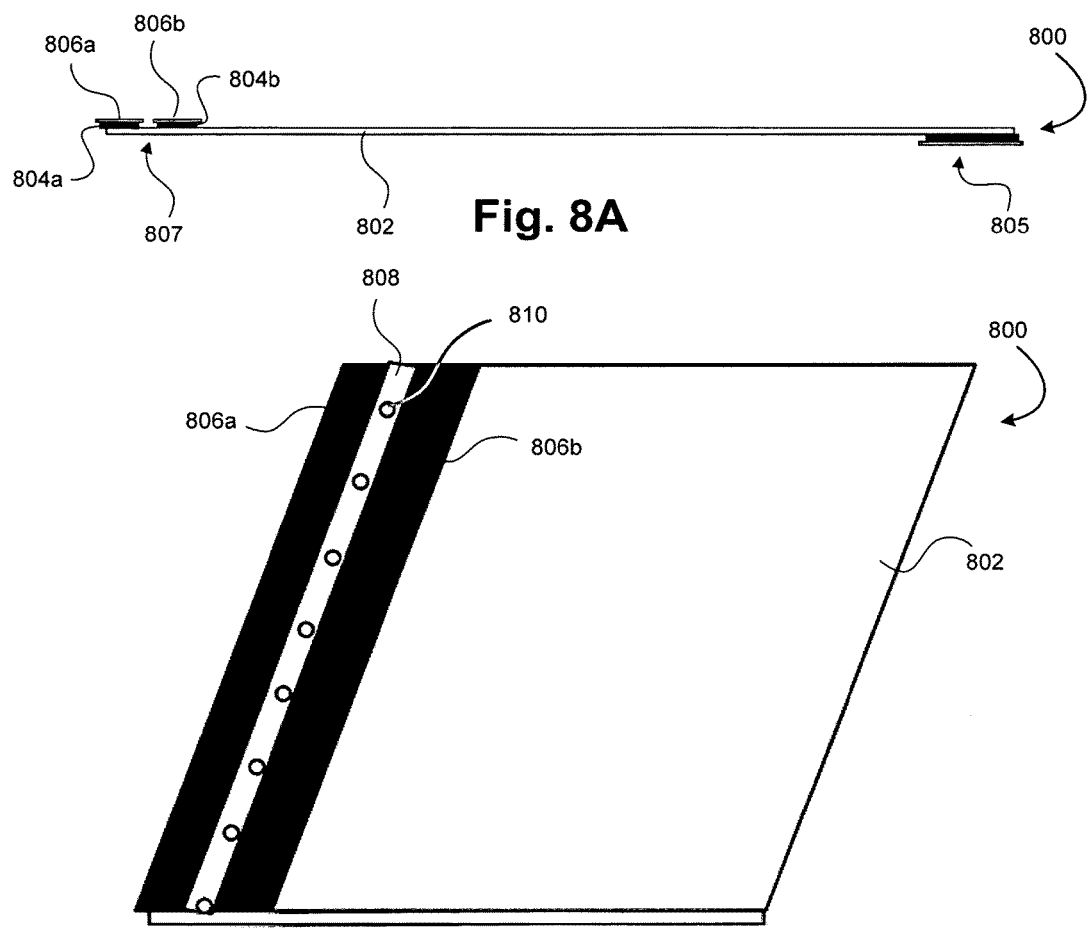
Fig. 8A
Fig. 8B
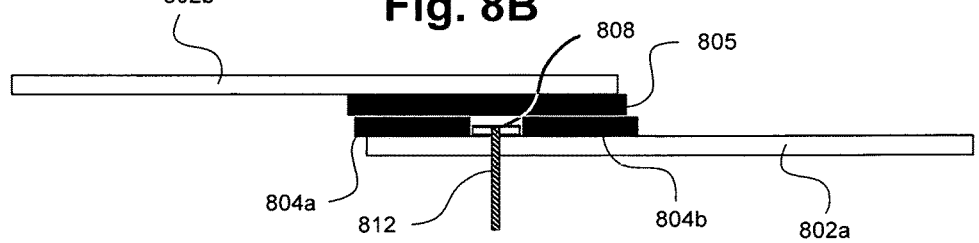
Fig. 8C

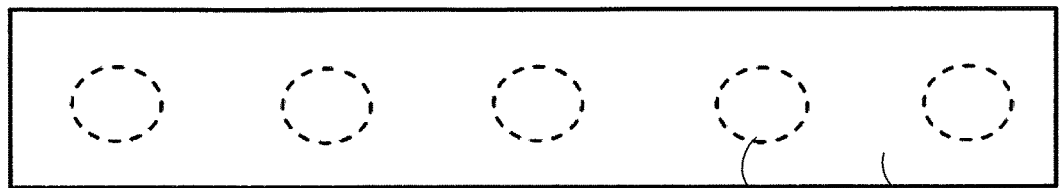
Fig. 9A
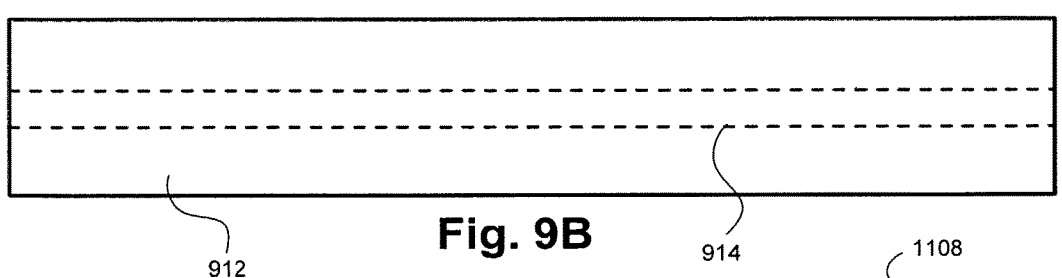
Fig. 9B
Fig. 11A
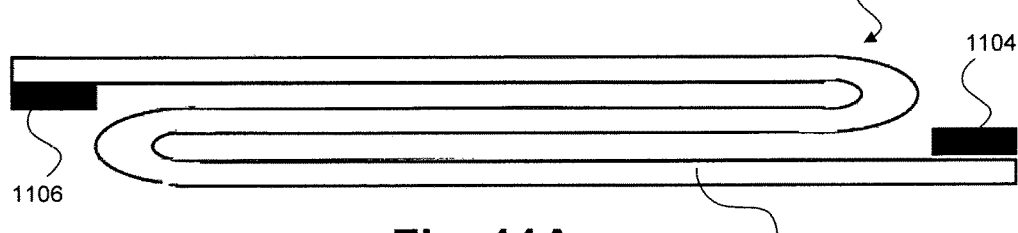
Fig. 11B
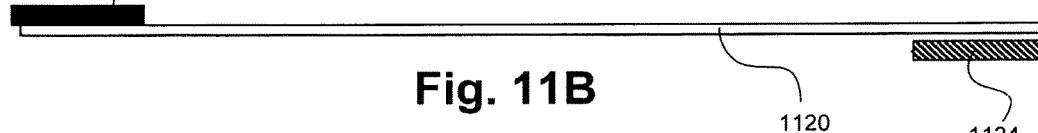
Fig. 11C
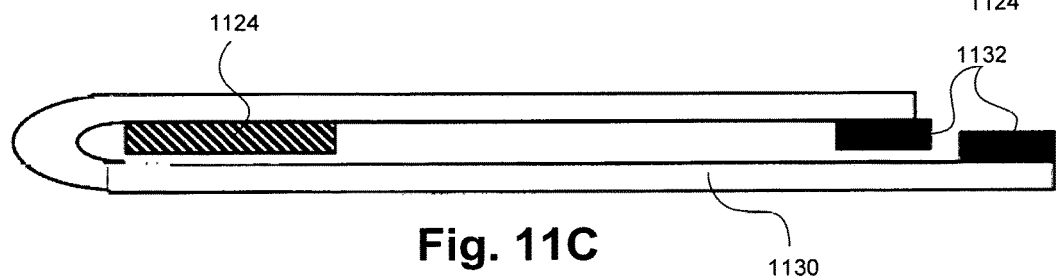

ROOFING MEMBRANES HAVING MULTIPLE ADHESIVE REGIONS AND METHOD THEREFOR

CROSS-REFERENCE TO RELATED APPLICATIONS

This application is a continuation of U.S. patent application Ser. No. 14/831,637 filed Aug. 20, 2015, which is a continuation-in-part of U.S. patent application Ser. No. 14/180,831 filed Feb. 14, 2014, now U.S. Pat. No. 9,234,352, issued Jan. 12, 2016, the entire disclosure of which is hereby incorporated by reference, for all purposes, as if fully set forth herein.

BACKGROUND OF THE INVENTION

Roofing membranes are commonly used for roofing systems of building and structures. Roofing membranes are often applied to the building or structure's roof to prevent leaks and/or to provide aesthetic appeal. Roofing membranes are commonly made of various synthetic rubber materials, modified bitumen, or thermoplastic materials.

Two common types of roofing membrane include those made of thermoplastic polyolefin (TPO) and those made of ethylene propylene diene monomer rubber (EPDM). TPO membranes are often white, but may be made in various other colors or shades, such as grey, black, and the like. Similarly, EPDM membranes are often black, but in some embodiments may also be white. White roofing membranes are often used to provide a pleasing visual appeal and/or to reflect radiation and thereby minimize heat island effects. Individual sections of EPDM membranes are often bonded together by priming or preparing an edges of the EPDM membranes and then applying a tape to the primed or prepared edges. Individual sections of TPO membranes are often coupled together by overlapping adjacent edges and heat welding the edges together. TPO may also be bonded by priming adjacent edges and using a tape.

BRIEF SUMMARY OF THE INVENTION

The embodiments described herein provide roofing membranes that may be easily installed atop a roof. Installation of the roofing membranes is simplified by the incorporation of materials on ends or edges of the roofing membrane. Each material is configured to aid in attaching the roofing membrane with a roof surface and/or an adjacent roofing membrane. According to one aspect, a roofing membrane includes a main body having: a top surface, a bottom surface positioned opposite the top surface, and four edges that define an outer periphery of the main body such that the main body has a rectangular or square profile. The roofing membrane also includes a first material bonded to the main body and positioned toward a first edge thereof and a second material bonded to the main body and positioned toward a second edge thereof. The first material extends along a majority of a length of the first edge and the second material extends along a majority of a length of the second edge. The second edge is positioned opposite the first edge such that the first and second materials are positioned toward opposite edges of the main body on optionally on opposite surfaces thereof. At least one of the first material or the second material comprises a first reactive material of a chemically reactive two-part cure system that is configured to chemically react upon contact of the first reactive material with a second reactive material of the chemically reactive two-part cure system.

In some embodiments, the first material may be positioned on one surface of the main body and the second material may be positioned on an opposite surface of the main body. The first material may be or include the first reactive material and the second material may be or include the second reactive material so that the roofing membrane includes both materials of the chemically reactive two-part cure system positioned on opposite edges of the main body. The first reactive material may be applied as a liquid directly to the roofing membrane surface, may be applied as a tape to the roofing membrane surface, or may be saturated in a carrier that is attached to the roofing membrane.

In some embodiments, the first material may be an adhesive tape and the second material may be or include the first reactive material. In such embodiments, the first reactive material may be applied as a liquid directly to the roofing membrane surface. The first material (e.g., adhesive tape) may be bonded to the main body such that an edge of the first material is laterally offset from an edge of the main body. The roofing membrane may be folded in a z-configuration with the folded section of the roofing membrane being disposed between the first material and the second material.

According to another aspect, a roof membrane system may include a first membrane that is positioned atop the roof. The first membrane may have a distal edge that includes a first reactive material on a top surface thereof. The first reactive material may extend along a majority of a length of the distal edge. The roof membrane system may also include a second membrane that is positioned atop the roof and adjacent the first membrane so that a proximal edge of the second membrane overlaps with and is bonded to the distal edge of the first membrane. The proximal edge of the second membrane may include a second reactive material on a bottom surface thereof. The second reactive material may extend along a majority of a length of the proximal edge. The first reactive material and the second reactive material may be configured to chemically react and cure upon contact with one another to bond the distal edge of the first membrane to the proximal edge of the second membrane. The first and second reactive materials may be configured not to cure prior to contact with the other reactive material.

In some embodiments, the roof membrane system may include a first membrane material that is releasably coupled with a top surface of the first reactive material and a second membrane material that is releasably coupled with a top surface of the second reactive material. In some embodiments, the first reactive material and/or the second reactive material may be resins. The first reactive material and/or the second reactive material may be applied as a liquid directly to the respective membrane. In other instances, the first reactive material and/or the second reactive material may be applied as a tape to the respective membrane, or may be saturated in a carrier that is attached to the respective membrane. The first reactive material may be applied as a liquid directly to the first membrane and the second reactive material may be applied as a tape to the second membrane or may be saturated in a carrier that is attached to the second membrane.

According to another aspect, a roofing membrane includes a main body having: a top surface, a bottom surface positioned opposite the top surface, and four edges that define an outer periphery of the main body such that the main body has a rectangular or square profile. The roofing membrane may include a first material that is bonded to the main body and positioned toward a first edge thereof and a second material that is bonded to the main body and positioned toward a second edge thereof. The first material may extend along a majority of a length of the first edge and the second material may extend along a majority of a length of the second edge. The second edge may be positioned opposite the first edge such that the first and second materials are positioned toward opposite edges of the main body.

In some embodiments, the first material may be an adhesive tape that is bonded with the roofing membrane. In such embodiments, the roofing membrane may further include a mechanical fastening member that is adhesively bonded with a top surface of the adhesive tape. The mechanical fastening member may be configured to receive a mechanical fastener to secure the roofing membrane to a roof surface. In other embodiments, the first material may be a mechanical fastening member that is configured to receive a mechanical fastener to secure the roofing membrane to a roof surface. The mechanical fastening member may be coupled with the roofing member prior to transport of the roofing member to an installation site. In yet other embodiments, the first material may include a pair of adhesive tapes that are bonded to the main body and that are positioned toward the first edge with a gap existing between the inner sides or edges of the pair of adhesive tapes. The gap may be sized so that a mechanical fastening member may be positioned therein. The mechanical fastening member may be configured to receive a mechanical fastener to secure the roofing membrane to a roof surface.

The roofing membrane may additionally include a releasable liner that is positioned and removably secured atop the first material. The releasable liner may include at least one scored or perforated region that is independently removable from a main body of the releasable liner. In such embodiments, the scored or perforated region of the releasable liner is positioned with respect to the main body of the releasable liner so as to aid in alignment of a mechanical fastening member with the first material. The mechanical fastening member may be configured to receive a mechanical fastener to secure the roofing membrane to a roof surface.

BRIEF DESCRIPTION OF THE DRAWINGS

The present invention is described in conjunction with the appended figures:

FIG. 4 illustrates a side view of an embodiment of a first roofing membrane and a second roofing membrane coupled together as part of a roofing system.

FIG. 5 illustrates a side view of another embodiment of a first roofing membrane and a second roofing membrane coupled together as part of a roofing system.

FIGS. 8A-C illustrate another roofing membrane having a pre-applied adhesive tape that facilitates in application of a mechanical fastening component to the roofing membrane.

FIGS. 9A and 9B illustrate releasable liners that may be used to cover and protect adhesive tapes of roofing membranes.

FIGS. 11A and 11C illustrate folding orientations that may be employed to alleviate issues associated with rolling a roofing membrane.

FIG. 11B illustrates a roofing membrane having a filler strip that is placed on an opposite side of the roofing membrane from a pre-applied tape.

Figure 1:
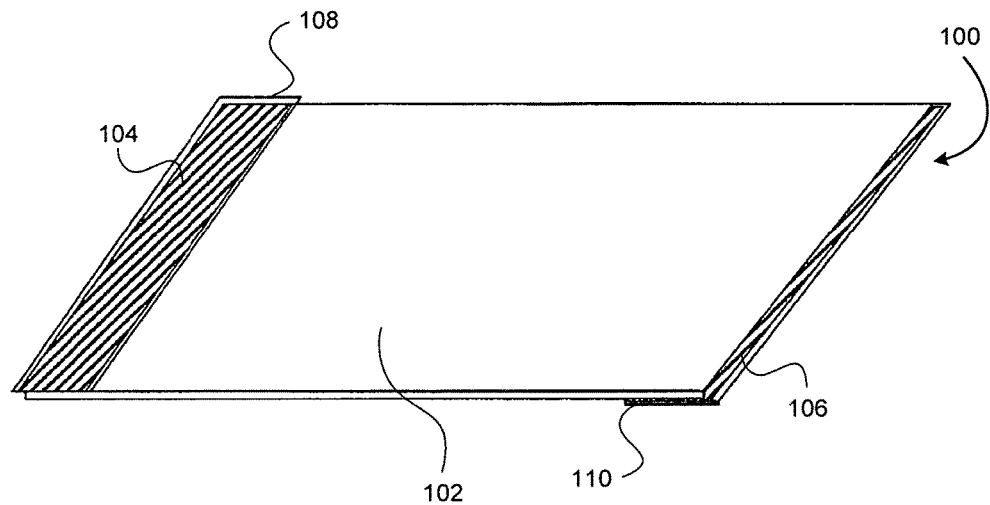
FIG. 1 illustrates a perspective view of an embodiment of a roofing membrane having multiple adhesive regions.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

The embodiments described herein provide roofing membranes that may be easily installed atop a roof. Installation of the roofing membranes is simplified by the incorporation of adhesive material and/or tape layers on opposing ends or edges of the roofing membrane. Each adhesive material and/or tape layer is positioned on an opposing surface of the roofing membrane in order to allow the edges of adjacent membranes to be overlapped and coupled or bonded together. For convenience in describing the embodiments herein, the adhesive material and/or tape will be generally described as an adhesive material or adhesive layer. It should be realized, however, that the description of the adhesive material or layer may encompass a variety of adhesives and/or tape layers. In some embodiments, the tapes and/or adhesive materials may be of the same material composition or could formed of various compositions including but not limited to reactive chemistries, pressure sensitive systems, and the like.

A releasable tape or liner may be releasably coupled to each of the adhesive materials to limit environmental exposure of the adhesive material and thereby maintain the adhesive properties of the material. The releasable liner of adjacent membranes may be easily removed at the job site prior to coupling of the membranes. The use of the releasable liner eliminates, or greatly reduces, the need for priming or preparation of the roofing membranes prior to coupling of the membranes. For example, an installer does not need to apply a solvent or solution to the roofing membrane in order to remove debris, oils, or other contamination that may impede or alter the coupling or bonding of adjacent roofing membranes. The elimination or reduction of this installation step greatly decreases the time in which a roof membrane system may be installed.

As used herein, the term roofing membrane means essentially any material that is installed atop a roof, typically as an outer surface or layer. Such roofing membranes are commonly installed for various functional and/or aesthetic purposes. For example, roofing membranes may be installed to provide weather proofing, reduce urban heat island effects via heat reflection, reduce UV damage, reduce roof maintenance and/or degradation, improving weathering characteristics, and the like. Roofing membranes may also provide a sleek and/or desired roof appearance, such as a uniform roof color and/or style.

Common roofing membranes include various thermoset materials, such as ethylene propylene diene monomer rubber (EPDM), modified bitumen, and various thermoplastic materials, such as Thermoplastic PolyOlefin (TPO). The embodiments described herein may find particular usefulness for roofing membranes constructed or EPDM, modified bitumen, and/or TPO materials, although the embodiments may be used for other thermoset and/or thermoplastic roofing membranes as desired.

Roofing systems often include various materials and/or layers in addition to the roofing membranes. These layers/materials are typically positioned under the roofing membrane and may include support members (e.g., wood and/or metal beams), insulation layers (e.g., form and/or other insulating boards), and/or other boards or members. The roofing membrane may be coupled with one or more of these materials via ballasting, mechanically fastening, adhesive bonding, heat welding, and the like.

Conventional roofing membranes are typically coupled together by overlapping adjacent edges, preparing or priming one or more edges, and then using an adhesive material to bond the adjacent edges or heat welding the adjacent edges together. In priming or preparing the edges, the installer must wait for the primer material to flash before applying the adhesive. Improper application of the primer and/or adhesive may result in an improper bond, which may create immediate and/or long term roofing problems, such as leakage. Human error, such as non-uniform application of the primer and/or adhesive material, may also result in inadequate or insufficient membrane adhesion, which may create short term and/or long term problems. These and other issues are reduced or eliminated via the roofing membrane embodiments described herein.

Referring now to FIG. 1, illustrated is an embodiment of a roofing membrane 100 that may be constructed of a thermoset material (e.g., EPDM), modified bitumen, or a thermoplastic material (e.g., TPO). Roofing membrane 100 includes a main body 102 having a top surface and a bottom surface positioned opposite the top surface. Main body 102 also includes for edges that defining an outer periphery of main body 102. Main body 102 typically has a square or rectangular profile. In many instances, main body 102 may have a lateral width of between about 10 and 40 feet, a longitudinal length of between about 50 and 100 feet, and a thickness of between about 0.045 and 0.090 inches, although it should be realized that these dimensions may vary depending on the application and/or need.

A first adhesive material or tape is bonded to, coupled to, or otherwise positioned atop the top surface of the main body 102. The first adhesive material or tape is positioned toward a first edge of the main body 102 and forms and adhesive material strip 104 or layer (hereinafter adhesive strip 104) atop the top surface of main body 102. The adhesive strip 104 extends along a majority of the first edge's length, and commonly along the entire length between opposing ends. The description of the adhesive strip 104 extending along the entire length of the first edge between opposing ends includes situations where the strip 104 is slightly shorter than the length of the first edge. For example, in some embodiments, the strip 104 may be coupled or bonded to the main body 102 between 3 and 6 inches short of an edge of the main body. In such embodiments, the last 3 to 6 inches on the end laps may be taped or adhered by a contractor or installer. The adhesive strip 104 is commonly between about 3 and 6 inches wide, although in some embodiments the strip 104 may be between ½ and 8 inches wide. The adhesive strip 104 may also be between 0.005 and 0.030 inches, and may be positioned with respect to main body 102 so that an edge of the adhesive strip 104 is aligned with, or offset from, the first edge as described in greater detail herein below. In other embodiments, the adhesive strip 104 may be inset from the first edge so that the first edge protrudes or extends laterally beyond the adhesive strip 104. In other embodiments, adhesive strip 104 may have a width greater than 6 inches or less than 3 inches as desired.

A second adhesive material or tape is bonded to, coupled to, or otherwise positioned atop the bottom surface of main body 102. The second adhesive material or tape is positioned toward a second edge of the main body 102 and forms an adhesive material strip 106 or layer (hereinafter adhesive strip 106) atop the bottom surface of main body 102. Like adhesive strip 104, adhesive strip 106 extends along a majority of the second edge's length, and commonly along the entire length between opposing ends. Adhesive strip 106 commonly has a width of between 3 and 6 inches, although other widths may be employed. Adhesive strip 106 may also be aligned with or offset from the second edge of main body 102 as desired. Alternatively, adhesive strip 106 may be inset from the second edge of main body 102 as described herein.

The second edge is positioned on an opposite side of main body 102 from the first edge so that opposing edges or ends of the main body 102 include the adhesive strips, 104 and 106. Further, the adhesive strips, 104 and 106, are positioned on opposing surfaces of the main body 102 to aid in coupling of adjacent roofing membranes 100 as described herein below. A releasable liner or tape is normally coupled with a top surface of the adhesive strips to prevent or limit environmental exposure of the adhesive material, which may degrade the adhesive material or otherwise compromise or interfere with bonding of the adhesive material. The releasable liner may also prevent premature drying or hardening of the adhesive material. The releasable liner may be constructed of a polymer or other material membrane, such as coated paper, metalized film, coated fabric, and the like, that releasably adheres to the adhesive material.

As shown in FIG. 1, a first liner or membrane 108 may be releasably coupled with adhesive strip 104 and a second liner or membrane 110 may be releasably coupled with adhesive strip 106. The liners, 108 and 110, may be sized slightly larger than the respective adhesive strips, 104 and 106, to allow the liners to fully cover and conceal the adhesive material. The slightly larger liners, 108 and 110, also make it easier for an installer to grasp an edge of the liner and remove the liner from the respective adhesive strips, 104 and 106, prior to or during installation of the roofing membrane 100.

The use of the adhesive strips, 104 and 106, on roofing membrane 100 decreases the amount of time required to install the membrane 100 onsite. For example, the adhesive strips, 104 and 106, eliminates the need for a contractor or installer to prime or prepare edges of the roofing membrane 100 in order to bond the roofing membrane 100 with an adjacent membrane. As such, an installer does not need to wait for the primer to flash, thereby decreasing the installer's wait time and allowing the installer to move on to the next stage of installation. Further, the adhesive strips, 104 and 106, may be bonded to the respective surfaces of main body 102 as part of the manufacturing process of the roofing membrane 100. Accordingly, the manufacturer has increased control over the bonding element or layer that is ultimately used in forming the roofing system, thereby eliminating or reducing human error and/or increasing the likelihood that the bonding element or layer is properly prepared. This may result in improved bonding between adjacent roofing membranes thereby minimizing or eliminating some or all of the short-term and long-term issues described above.

Figure 2:
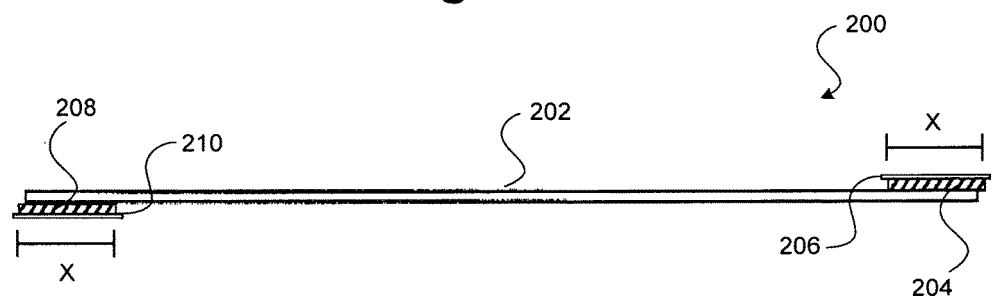
FIG. 2 illustrates a side view of an embodiment of a roofing membrane having multiple adhesive regions.

Referring now to FIG. 2, illustrated is another embodiment of a roofing membrane 200. Roofing membrane 200 is similar to membrane 100 in that membrane 200 has a main body 202 that includes a first adhesive strip 204 positioned on one side of the main body 202 and a second adhesive strip 208 positioned on an opposite side of the main body 202. As described above, the adhesive strips, 204 and 208, are positioned on opposing surfaces of main body 202. A releasable tape or liner 206 is releasably coupled atop the first adhesive strip 204 while a releasable tape or liner 210 is releasably coupled atop the second adhesive strip 208. FIG. 2 illustrates that the adhesive strips, 204 and 208, may be applied so as to have a relatively equal thickness and width on the opposing sides and surfaces of main body 202.

Employing relatively equal thickness and width adhesive strips, 204 and 208, may eliminate or reduce common problems associated with rolling up the membrane 200 for transportation and/or storage. For example, if membrane 200 includes only one adhesive strip material (i.e., 204 or 210), as the membrane 200 is rolled about a core, the single adhesive strip may cause the thickness of the roll to increase disproportionately on one side of the core, thereby varying the thickness of the roll product across the web of the roll. A varying thickness of the roll product may cause the roll product to telescope about the core during wind up and/or cause the membrane 200 to curve or bend as it is being unrolled atop a roof. In contrast, by applying the adhesive strips, 204 and 208, to opposing ends and/or surfaces of main body 202, the resulting roll product has a relatively equal thickness about the core, which aids in preventing telescoping during wind up and/or aids in keeping the membrane 200 straight as it is rolled out atop a roof.

Figure 3:
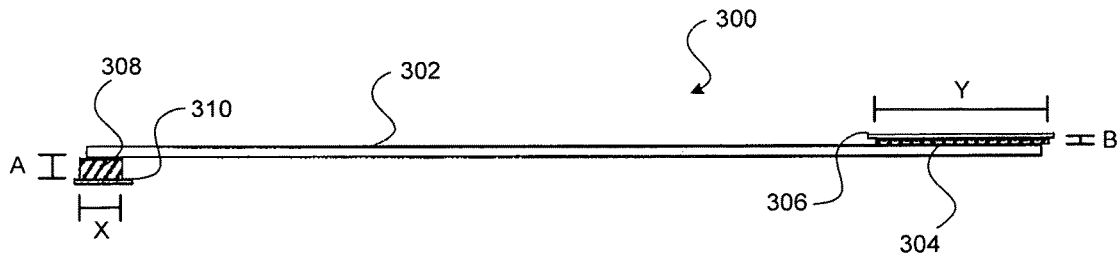
FIG. 3 illustrates a side view of another embodiment of a roofing membrane having multiple adhesive regions.

Referring now to FIG. 3, illustrated is another embodiment of a roofing membrane 300 having a main body 302 with an adhesive strip 304 positioned on one side of the main body 302 and another adhesive strip 308 positioned on an opposite side and opposite surface of the main body 302 as described above. Releasable liners, 306 and 310, are releasably coupled with a top surface of the respective adhesive strips, 304 and 308. The adhesive strips, 304 and 308, are different from those previously described in that the strips having varying widths and/or thicknesses. For example, adhesive strips 304 has a width of Y and a thickness of B while adhesive strip 308 has a width of X and a thickness of A. The widths and/or thicknesses of the respective adhesive strips, 304 and 308, may be within the ranges previously described. In some embodiments, the widths, Y and X, of the adhesive strips, 304 and 308 respectively, may vary, while in other embodiments the thicknesses, B and A, of the adhesive strips, 304 and 308 respectively, may vary. In some embodiments, both the widths and the thicknesses of the adhesive strips, 304 and 308, may vary.

Varying the widths and/or thicknesses of the adhesive strips, 304 and 308, may aid in coupling of adjacent roofing membranes and/or forming a roofing membrane system about a uniquely shaped roof. For example, wider and/or thinner adhesive strips (e.g., adhesive strip 304) may be used when a greater bonding surface area is desired while narrower and/or thicker adhesive strips (e.g., adhesive strips 308) may be used when an edge of the roofing membrane 300 is butted up against a corner of the roof. In some embodiments, the roofing system formed atop a roof may include a combination of roofing membranes having relatively equal sized adhesive strips and roofing membranes having relatively unequal sized adhesive strips as needed.

Referring now to FIGS. 4-5, illustrated are embodiments in which adjacent roofing membranes are coupled or bonded together to form a roofing system. For example, FIG. 4 illustrates a roofing system 400 formed of a bonded or coupled first roofing membrane 402 and second roofing membrane 404. The first and second roofing membranes, 402 and 404, may be constructed similarly to those described herein above having a main body with opposing ends and surfaces having an adhesive strip. In coupling or bonding the adjacent membranes, 402 and 404, a distal edge of membrane 402 is overlapped with a proximal edge of membrane 404 so that the adhesive materials, 406 and 408, of the respective membranes are vertically aligned. The releasable liners (not shown) of the adhesive materials, 406 and 408, may then be removed and the adhesive materials pressed together to couple or bond the membranes, 402 and 404, together. The adhesive strips, 406 and 408, bond well together eliminating the need to prime any membrane surface for bonding strength.

As shown in FIG. 4, the adhesive strips, 406 and 408, may be aligned relative to one another so that a proximal edge 410 and/or a distal edge 412 of each adhesive strip, 406 and 408, is aligned. Stated differently, the proximal edge 410 and/or distal edge 412 of the coupled strips, 406 and 408, may be relatively flush after the membranes, 402 and 404, are coupled together. Similarly, adhesive strip 406 and/or adhesive strip 408 may be offset 414 from the edge of the respective membrane, 402 and 404. In some embodiments, the adhesive strip or strips may be offset 414 from the respective membrane by between about 1/16 and 1/4 of an inch, and more commonly by about 1/8 of an inch. Alternatively, the adhesive strip or strips may be inset from the respective membrane by between about 1/16 and 1/4 of an inch, and more commonly by about 1/8 of an inch.

Offsetting the adhesive strips from the respective membranes in this manner may allow a contractor or installer to quickly and easily visually inspect the adhesive bond between the membranes, 402 and 404, and/or to determine that the coupled membranes provide a sufficient waterproofing layer. For example, after installation of the roofing system, a contractor or installer may quickly and easily traverse the roofing membranes' seams and inspect the bond between the coupled membranes by inspecting the portion of the adhesive strips that protrude from the seams. The contractor or installer may determine if any gaps or other irregularities exist in the coupled adhesive layers and/or between the adhesive layer and the respective membrane. The contractor or installer may also visually determine whether the coupled membranes are sufficiently waterproof by inspecting the protruding adhesive strips for gaps, cracks, separations, or any other defects that may signal an incomplete or otherwise improper bond between the adjacent membranes and/or adhesive layers that may result in water leakage or other potential problems.

The protrusion of the adhesive strips, 406 and 408, from the seam of the coupled membranes, 402 and 404, may also improve the waterproofing characteristics of the membrane system. For example, the protruding adhesive strip material may minimize or eliminate gaps that may otherwise be formed under the coupled membranes' seam within which water and/or ice may penetrate and cause leakage or other problems. In this manner, the protruding adhesive strip material may function similar to caulking to effectively seal the seams and may eliminate the need for a separate caulking step to be performed.

FIG. 5 illustrates another embodiment of a roofing system 500 having a first roofing membrane 502 bonded or coupled with a second roofing membrane 504. Similar to roofing system 400, the membranes, 502 and 504, of system 500 are bonded by aligning and pressing together respective adhesive strips, 506 and 508. Unlike system 400, however, the adhesive strip 506 of membrane 502 is aligned with membrane 502's distal edge 514 while the adhesive strip 508 of membrane 504 is offset from membrane 504's proximal edge 516. The difference in alignment of the adhesive strips, 506 and 508, results in an offset or staggered alignment of the coupled adhesive strips proximal edge 510 and/or distal edge 512. This staggered relationship of the adhesive strips may aid in the visual inspection of the coupled membranes by visually delineating the bonding interface between the adhesive strips, 502 and 504. The staggered relationship of the adhesive strips may also minimize or eliminate formation of folds or defects during installation, which may improve the waterproofing ability of the system 500. For example, the tape (e.g., butyl tape) is typically soft and easily deforms. In contrast, cured EPDM membranes typically have some stiffness and body so that they will not fold or crease as easily as the tape. As such, the cured EPDM membrane holds the tape in place, thus decreasing the chance for defects to form in the tape.

In any event, one of the adhesive strips should protrude from the seam of coupled membranes, 502 and 504, by between about 1/16 and 1/4 inch, and more commonly by about 1/8 inch to provide the visual inspection and/or waterproofing benefits previously described. Preferably the bottom or lower adhesive strip (i.e., adhesive strip 508 in FIG. 5) protrudes from the seam to prevent formation of gaps within which water or ice may penetrate.

Figure 6:
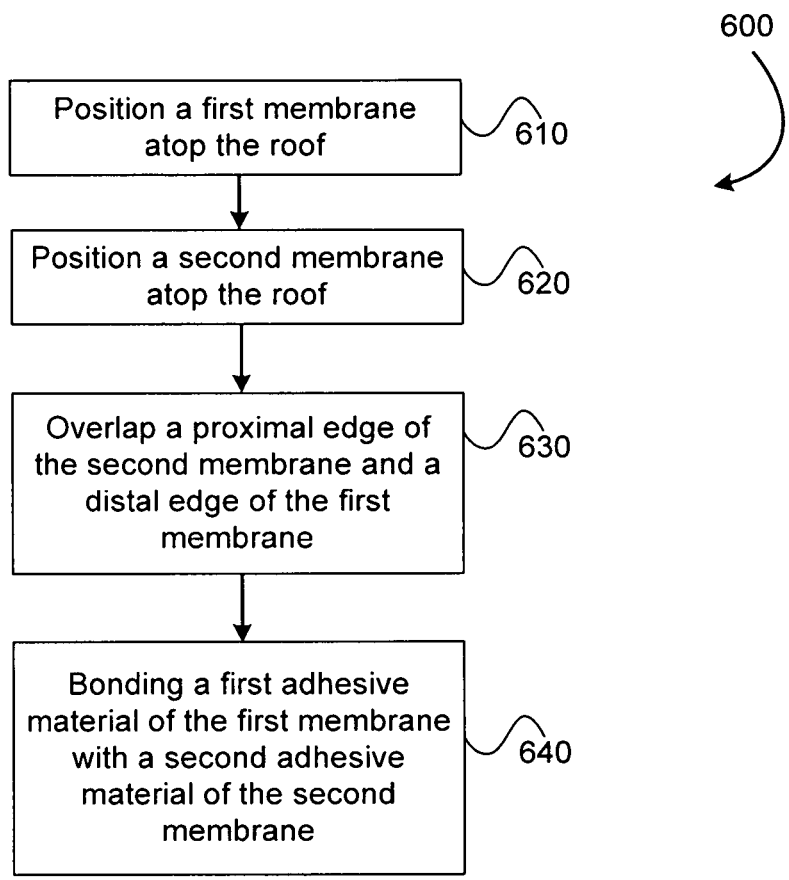
FIG. 6 illustrates a method of coupling roofing membranes atop a roof as part of a roofing system.

Referring now to FIG. 6, illustrated is a method 600 of coupling roofing membranes atop a roof. The roofing membranes may be similar to any of those described herein. At step 610, a first membrane is positioned atop the roof and at step 620, a second membrane is positioned atop the roof. At step 630, a proximal edge of the second membrane is overlapped with a distal edge of the first membrane. As described herein, the distal edge of the first membrane includes a first adhesive material on a top surface thereof that extends along a majority of a length of the distal edge and the proximal edge of the second membrane includes a second adhesive material on a bottom surface thereof that extends along a majority of a length of the proximal edge. At step 640, the first adhesive material is bonded with the second adhesive material to couple the first and second membranes together atop the roof.

In some embodiments, the method further includes removing a membrane material from either or both the first adhesive material or the second adhesive material. As described herein, the membrane material limits the environmental exposure of the adhesive material. In some embodiments, the first adhesive material and the second adhesive material have roughly the same width. In other embodiments, the width of the first adhesive material may be smaller than the width of the second adhesive material or vice versa.

In some embodiments, the method may also include aligning the first adhesive material with the second adhesive material so that an edge of the first adhesive materials aligns with an edge of the second adhesive material. In other embodiments, the method may include aligning the first adhesive material with the second adhesive material so that an edge of the first adhesive materials is offset from an edge of the second adhesive material. In any of the embodiments, the method may additionally include coupling either or both the first membrane or the second membrane with the roof via ballasting, mechanically fastening, heat welding, adhesive bonding, and the like.

In some embodiments, the roofing membrane (e.g., EPDM, TPO, modified bitumen, etc.) may be attached with a mechanical fastener or fastening system. For example, a strip, plate, bar, or other component of material may be atop one or more edges of the roofing membrane and used to mechanically secure the roofing membrane to the roof surface. The strip, plate, bar, or other fastening component may include precut holes through which a mechanical fasteners, such as a bolt or screw, is inserted. In some embodiments, the adhesive tape may aid in securing the strip, plate, bar, or other fastening component to the roofing membrane. In other embodiments, the strip, plate, bar, or other fastening component is pre-assembled with the roofing membrane. The strip, plate, bar, or other fastening component may be used to secure the roofing membrane (often a single-ply membrane) to steel, wood, concrete, gypsum, and other cementitious decks. An example of the strip, plate, bar, or other fastening component that may be used to mechanically secure the roofing membrane is a batten bar (hereinafter batten bar). For ease in describing the embodiments herein, the strip, plate, bar, or other fastening component will be referred to generally as a mechanical fastening component or member.

The mechanical fastening component may be made of various types of metal materials, polymer materials, and the like. When metal materials are employed, the edges, corners, and precut holes are typically rounded and/or deburred. The polymer mechanical fastening component may be particularly useful in attached the roofing membrane to steel, wood, and structural concrete roof decks. The pre-applied adhesive strips or tape (hereinafter adhesive tape) that is applied at the seams of the roofing membrane as described herein, decreases the amount of time required to install the roofing membrane on site when a mechanical fastening component is used. Specifically, the pre-applied adhesive tape eliminates the time required to wait for the tape primer to flash, thus decreasing a contractor's overall installation time by allowing the job to progress quickly to the mechanical fastening stage or other stages. The pre-applied adhesive tape, which may be applied on a single side or both sides of the roofing membrane, eliminates the need for the contractor to prime the membrane prior to application of the mechanical fastening component.

Figure 7A:
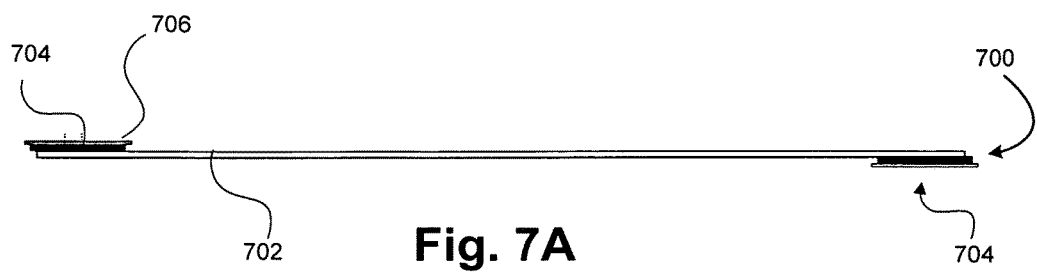
FIGS. 7A-C illustrate a roofing membrane having a pre-applied adhesive tape that facilitates in application of a mechanical fastening component to the roofing membrane.
Figure 7B:
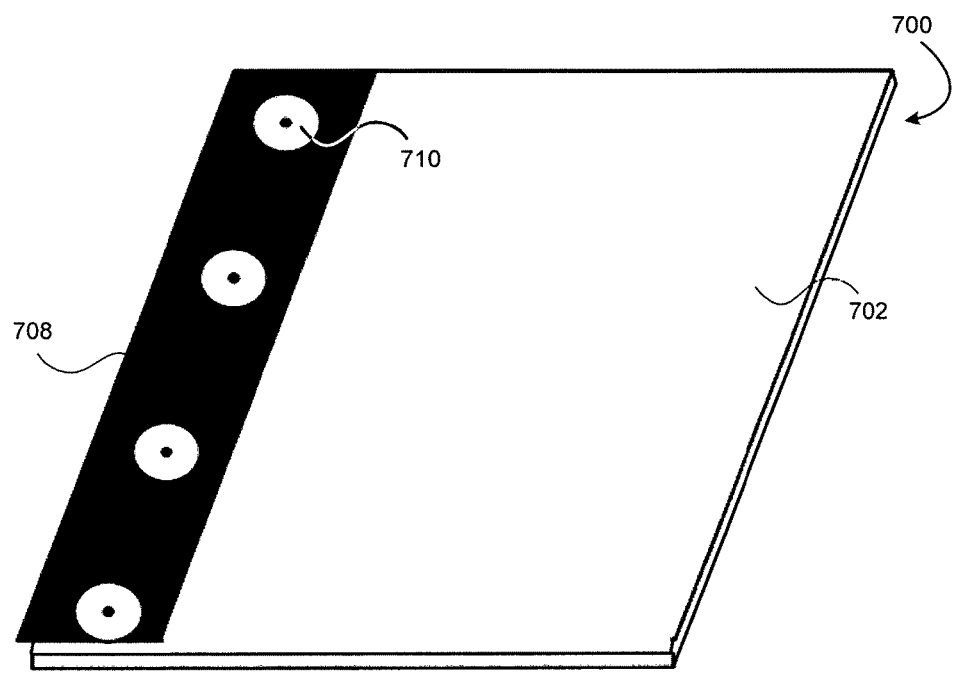
Figure 7C:
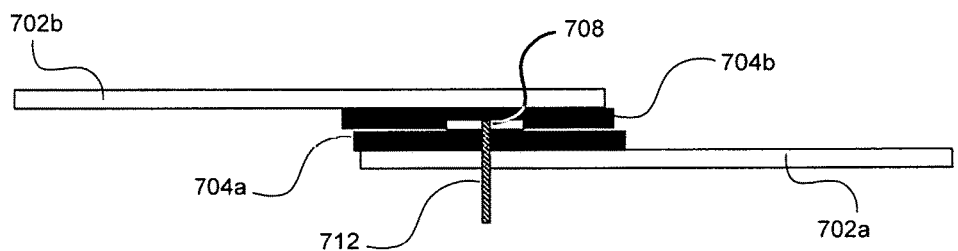

Referring now to FIGS. 7A-C, illustrated is an embodiment 700 of a roofing membrane 702 having a pre-applied adhesive strip or tape 704 (hereinafter adhesive tape 704) that is configured to facilitate in application of a mechanical fastening component that is used to attach or secure the roofing membrane 702 to the roof surface. The adhesive tape 704 may be configured and/or arranged similar to any of the embodiments described herein. Specifically, the adhesive tape 704 is pre-applied to at least one side of the roofing membrane 702, and often to both sides on opposite faces or surfaces and opposite sides of the roofing membrane 702 as illustrated. A releasable liner 706 is attached to a top surface of the adhesive tape 704 to protect the tape 704 and prevent degradation or contamination of the adhesive material. An exemplary releasable liner 902 that may be used with the roofing membrane 702 is illustrated in FIG. 9A. The releasable liner 902 may aid a contractor in applying a mechanical fastening component atop the adhesive tape 704.

FIG. 7B illustrates a mechanical fastening component 708 being positioned atop and adhesively bonded to the adhesive tape 704. The mechanical fastening component 708 includes at least one hole 710, and typically includes a plurality of holes 710. The holes 710 are formed into the mechanical fastening component 708 and serve as attachment or securing locations for mechanical fasteners, such as bolts, screws, and the like. The mechanical fastening component 708 may be formed with various standard or custom hole spacing, including 3-inch on center, 6-inch on center, 12-inch on center, and the like. In installing the mechanical fastening component 708, an installer removes the releasable liner 706 from the adhesive tape 704 and then install the mechanical fastening component 708 over and atop the adhesive tape 704. As illustrated in FIG. 7B, the mechanical fastening component 708 is typically applied to one face or surface (i.e., the top face) and one side of the roofing membrane 702. The opposite or other adhesive tape 704 is typically free of a mechanical fastening component 708 and is able to attach and adhesively bond with an adhesive tape 704 and/or mechanical fastening component 708 of a separate and adjacent roofing membrane.

In other embodiments, the roofing membrane 702 may include two mechanical fastening components 708. Specifically, separate mechanical fastening components 708 may be attached to the opposite faces/surfaces and opposite sides of the roofing membrane 702 so that the roofing membrane 702 includes two mechanical fastening component 708 on both surfaces and on opposite sides. Other arrangement or configurations are also possible, such as two mechanical fastening components 708 on the same surface and opposite sides, two mechanical fastening components 708 on the same (or opposite) surfaces and on adjacent sides, and the like. The latter configuration may be particularly useful when the roofing membrane 702 is being attached to a corner of the roof surface.

In some embodiments, the mechanical fastening component 708 is pre-applied to the roofing membrane 702, which eliminates the need for the installer to apply the mechanical fastening component. In such embodiments, the releasable membrane 706 may be positioned atop the mechanical fastening component 708 so that the installer need only remove the releasable liner 706 and then mechanically fasten the roofing membrane 702 to the roof surface. A second roofing membrane may then be attached to the roofing membrane 702 having the pre-applied mechanical fastening component 708. The mechanical fastening component 708 may be coupled with the roofing membrane 702 using the adhesive tape 704 and/or using any other fastening or adhesive technique known in the art.

FIG. 7C illustrates a first roofing membrane 702a coupled with a second roofing membrane 702b atop a roof surface. A mechanical fastening component 708 is attached to the first roofing membrane 702a as described herein. Specifically, an installer may adhesively bond the mechanical fastening component 708 with the adhesive tape 704a of the first roofing membrane 702a as described above, or the mechanical fastening component 708 may be pre-applied to the first roofing membrane 702a. When the mechanical fastening component 708 is pre-applied to the first roofing membrane 702a, the adhesive tape 704a shown in FIG. 7C may represent the mechanical fastening component 708.

A mechanical fastener 712, such as a bolt or screw, is disposed through one of the hole 710 of the mechanical fastening component 708 to couple the first roofing membrane 702a with the roof surface. A mechanical fastener 712 may similar be positioned through the other holes 710 of the mechanical fastening component 708 to couple the first roofing membrane 702a to the roof surface.

An edge of a second roofing membrane 702b is positioned atop and coupled with the adhesive tape 704a (or mechanical fastening component 708) of the first roofing membrane 702a. Specifically, the adhesive tape 704b of the second roofing membrane 702b is adhered to the adhesive tape 702a of the first roofing membrane 702a. Edges or sides of the adhesive tapes, 704a and 704b, may be offset from one another or aligned as described herein. In some embodiments, the adhesive tape 704b of the second roofing membrane 702b may be disposed fully around the mechanical fastening component 708 as illustrated in FIG. 7C. In such embodiments, the adhesive tapes, 704a and 704b, may encase or enclose the mechanical fastening component 708 and effectively seal the mechanical fastening component 708 from the surrounding environment. In other embodiments, the adhesive tape 704b of the second roofing membrane 702b may only surround or enclose a portion of the mechanical fastening component 708, or the mechanical fastening component 708 may be sized and shaped similar to the adhesive tape 704b.

Although FIG. 7C illustrates only one side of the first roofing membrane 702a and the second roofing membrane 702b, it should be realized that the opposite sides of the respective roofing membranes may be similarly coupled with the roof surface and/or an adjacent roofing membrane. For example, the opposite side of the second roofing membrane may be coupled with a mechanical fastening component 708 and an adhesive tape of a third roofing membrane in a manner similar to that illustrated in FIG. 7C. In other embodiments, the opposite side of the first roofing membrane 702a and/or second roofing membrane 702b may be adhesively bonded to an adjacent roofing membrane without using a mechanical fastening component 708.

In some embodiments, the mechanical fastening component 708 may be embedded within the adhesive tape 704. In such instances, the adhesive tape 704 may be attached to one or more sides or edges of the roofing membrane 702 as described herein with the mechanical fastening component 708 disposed or embedded within the adhesive tape 704. Such embodiments eliminate the need for the mechanical fastening component 708 to be attached or adhered to the adhesive tape 704 in a subsequent process. The releasable liner 706 may be perforated or otherwise marked so as to indicate or identify the holes 710 that a mechanical fastener is positioned through to secure the roofing membrane 702 to a roof surface. The mechanical fastener may be positioned through the holes 710 using the perforations or markings of the releasable liner 706 and then the liner 706 may be removed to allow the roofing membrane 702 to be attached or coupled with an adjacent membrane. In some instances, the mechanical fastening component 708 may be embedded or disposed within the adhesive tape 704 by sandwiching the mechanical fastening component 708 between a pair of adhesive tapes. In other instances, the adhesive tape 704 may include a groove, slot, or depression within which the mechanical fastening component 708 is positioned.

Referring now to FIGS. 8A-C, illustrated is another embodiment 800 of a roofing membrane 802 having pre-applied adhesive strips or tapes, 804*a* and 804*b*, (hereinafter adhesive tapes 804*a* and 804*b*) that are configured to facilitate in application of a mechanical fastening component attaches or secures the roofing membrane 802 to the roof surface. Specifically, one side of the roofing membrane 802 includes a pair of adhesive tapes, 804*a* and 804*b*, instead of a single adhesive tape 704 as shown in FIGS. 7A-C. The adhesive tapes, 804*a* and 804*b*, are applied to the roofing membrane 802 so that a gap 807 exists between the adhesive tapes 804*a* and 804*b*. The outer most adhesive tape 804*a* may extend outward from an edge of the roofing membrane 802 as shown, or may be substantially aligned with the edge of the roofing membrane 802. The adhesive tapes, 804*a* and 804*b*, typically have a similar width, length, and thickness, but one or more of these parameters may be varied depending on the application or need of the roofing membrane 802, or for various other reasons.

The gap 807 between the adhesive tapes, 804*a* and 804*b*, may be between about 0.5 and 4 inches, and more commonly between about 0.5 and 1.5 inches. The gap 807 is typically sized and shaped to accommodate a mechanical fastening component. A releasable liner, 806*a* and 806*b*, is applied atop each of the adhesive tapes, 804*a* and 804*b*, as illustrated. The releasable liners, 806*a* and 806*b*, conceals and protects the adhesive material of adhesive tapes, 804*a* and 804*b*, from degradation or other fouling. In some embodiments, the releasable liners, 806*a* and 806*b*, may be separate liners while in other embodiments a single releasable liner may be used to cover both adhesive tapes 804*a* and 804*b*. An exemplary embodiment of a releasable liner 912 that may be used to cover the adhesive tapes, 804*a* and 804*b*, is illustrated in FIG. 9B.

The opposite side and surface (e.g., bottom surface) of the roofing membrane 802 may also include an adhesive tape. The adhesive tape may be a single solid tape material 805, such as those described herein and illustrated in FIG. 8A, or may be a pair of adhesive tapes similar to the adhesive tapes 804*a* and 804*b*.

FIG. 8B illustrates a mechanical fastening component 808 being coupled with the adhesive tapes, 804*a* and 804*b*, of roofing membrane 802. In some embodiments, the mechanical fastening component 808 is positioned within the gap 807 between the adhesive tapes 804*a* and 804*b*. In such embodiments, the adhesive tapes, 804*a* and 804*b*, may adhesively bond only with respective sides of the mechanical fastening component. As such, a top surface of the adhesive tapes, 804*a* and 804*b*, may be relatively free to directly adhesively bond with the adhesive tape of an adjacent roofing membrane. A main body of the mechanical fastening component 808 may be mechanically fastened or adhesively bonded directly with the roofing membrane 802. The configuration of FIG. 8A may find particular usefulness when the mechanical fastening component 808 is narrower or substantially the same width as the gap 807.

In other embodiments, the mechanical fastening component 808 may be adhered or secured to the roofing membrane 802 via the adhesive tapes 804*a* and 804*b*. Specifically, the opposing sides or edges of the mechanical fastening component 808 may be adhesively bonded with the adhesive tapes 804*a* and 804*b*. The opposite side of the roofing membrane (i.e., the right hand side of FIG. 8B) may similarly include a mechanical fastening component 808, or may only include the adhesive tape 805. In any event, the mechanical fastening component typically includes a plurality of holes 810 that are configured for receiving a mechanical fastening component, such as a bolt or screw.

An installer may position the mechanical fastening component 808 within the gap 807 and/or between the adhesive tapes, 804*a* and 804*b*, prior to coupling the roofing membrane 802 with a roof surface. The installer may adhere the mechanical fastening component 808 within the gap 807 and/or remove a releasable liner on a pre-applied adhesive material within the gap 807 to attach the mechanical fastening component 808 with the roofing membrane 802. In other instance, the mechanical fastening component 808 may be pre-applied to the roofing membrane 802 within the gap 807 so that installation of the mechanical fastening component 808 by an installer is not needed.

Referring now to FIG. 8C, the installation of the roofing membrane to a roof is illustrated. Specifically, a mechanical fastening component 808 is positioned between adhesive tapes, 804*a* and 804*b*, of a first roofing membrane 802*a*. A mechanical fastener 812 is then inserted through one or more holes 810 of the mechanical fastening component 808 to secure the first roofing membrane 802 with the roof surface. An edge or side of a second roofing membrane 802*b* is then positioned over the side or edge of the first roofing membrane 802*a* that is secured with the roof surface. The adhesive tape 805 of the second roofing membrane 802*b* is then adhesively bonded or coupled with the adhesive tapes, 804*a* and 804*b*, of the first roofing membrane 802*a*. Releasable liners (not shown) of the respective adhesive tapes (i.e., 805, 804*a* and 804*b*) are removed sometime prior to coupling the first roofing membrane 802*a* and second roofing membrane 802*b*.

The adhesive tape 805 of the second roofing membrane 802*b* may be offset from the edge or side of one or both adhesive tapes, 804*a* and 804*b*, as illustrated, or may be substantially aligned with a side or edge of one or both adhesive tapes, 804*a* and 804*b*, as desired. In additional, although FIG. 8C illustrates the second roofing membrane 802*b* including a single adhesive tape 805, in some embodiments the second roofing membrane may include a pair of adhesive tapes (not shown) similar to the configuration of the adhesive tapes, 804*a* and 804*b*, of the first roofing membrane 802*a*.

One advantage of the roofing membrane configuration of FIG. 8C is that the mechanical fastening component 808 is entirely enclosed and sealed by the adhesive tapes (i.e., 805, 804*a* and 804*b*) of the first and second roofing membranes, 802*a* and 802*b*. The adhesive tapes (i.e., 805, 804*a*, and 804*b*) are also able to directly adhesively bond with one another, which may improve the water proofing of the roofing system.

The opposite side or edge of the first roofing membrane 802*a* and/or second roofing membrane 802*b* may be coupled with an adjacent roofing membrane in a manner similar to that illustrated in FIG. 8C. In other embodiments, the opposite side or edge of the first roofing membrane 802*a* and/or second roofing membrane 802*b* may be adhered directly to the adhesive tape (or directly to the roofing membrane) of an adjacent roofing membrane without using a mechanical fastening component 808.

Referring now to FIGS. 9A and 9B, illustrated are exemplary releasable liners that may be used to cover and protect the adhesive tapes (or mechanical fastening components) of the roofing membranes of FIGS. 7A-8C. The releasable liners include scored sections that enable an installer to easily locate a position for the mechanical fastening component or mechanical fasteners. For example, the releasable liner may be used to align the mechanical fastening component with the adhesive tape and/or align the mechanical fastener about a fastening hole in the mechanical fastening component.

Referring to FIG. 9A, the releasable line 902 includes a main body that is typically rectangular in shape and sized slightly larger than the adhesive tape or mechanical fastening component atop which it is applied. The releasable line 902 includes a plurality of scored or perforated sections 904 that may easily detach from the main body of the releasable line 902. The scored or perforated sections 904 commonly correspond to the fastening holes 710 of the mechanical fastening component 708. The scored or perforated section 904 may be aligned with the fastening holes 710 of the mechanical fastening component 708 to ensure that the mechanical fastening component 708 is properly aligned with the adhesive tape 804. To aid in alignment, the scored or perforated sections 904 may be a different color than the main body of the releasable line 902 or may include other marking that make the scored or perforated sections easily identifiable and visible. In some embodiments, the main body of the releasable line 902 may be peeled off of the adhesive tape and the scored or perforated section 904 may remain attached to the adhesive tape. In this manner, the scored or perforated sections 904 may be used for alignment of the mechanical fastening component 708 even after the releasable liner 902 is removed. The mechanical fastening component 708 may then be pressed onto the adhesive tape, which may secure the mechanical fastening component 708 in position until the mechanical fasteners are inserted through the fastening holes 710.

Removing the releasable liner 902 to expose the underlying adhesive tape provides a tacky surface that grips or sticks to the mechanical fastening component 708. Placing the mechanical fastening component 708 on the exposed adhesive tape ensures that the mechanical fastening component 708 is held it in place during installation of the roofing membrane. This function may be especially with polymer material mechanical fastening components 708, which may be inclined to curl up in the longitudinal direction. The curling of the mechanical fastening components 708 may be especially prevalent when the mechanical fastening component 708 is wound and stored for shipping. The exposed adhesive tape secures and holds the mechanical fastening component 708 on the roofing membrane making it relatively easy for an installer to drive the mechanical fastener through the fastening holes 710.

When the mechanical fastening component 708 is pre-assembled or applied to the roofing membrane, the scored or perforated sections 904 may be disposed immediately above the fastening holes 710 to identify the location of the holes. The scored or perforated section 904 may be removed and mechanical fasteners inserted through the fastening holes 710 to secure the roofing membrane to the roof surface. The remainder of the releasable liner 902 may then be subsequently removed. In other embodiments, the mechanical fastening component 708 may not be adhesively bonded to the adhesive tape 704. In such embodiments, a center strip of the perforated liner (i.e., 914 of FIG. 9B or the center portion of liner 902) may be removed to hold the mechanical fastening component 708 in position while the mechanical fasteners are attached. The outer strips or portions of the liner 902 or 912 may then be removed to imbed the fasteners.

Referring to FIG. 9B, another releasable liner 912 is illustrated. The releasable liner 912 of FIG. 9B includes a scored or perforated mid-section 914 that corresponds to the gap 807 that exists between the adhesive tapes, 804a and 804b, of the roofing membrane 802. The scored or perforated mid-section 914 aids in aligning the mechanical fastening component 808 by identifying where the gap 807 is located. In operation, the scored or perforated mid-section 914 may be detached and removed from the remainder of the releasable liner 912, such as by peeling this section 914 away from the releasable liner 912. The mechanical fastening component 808 may then be positioned within the gap 807 and secured to the roofing membrane and/or roof surface as described herein. The remaining portions of the releasable liner 912 may then be removed to expose the adhesive material of the adhesive tapes 804a and 804b.

In some instances an adhesive tape that is pre-applied to a roofing membrane may partially or fully cure while in storage and/or transport, especially when the roofing membrane is stored for an extensive period of time. The adhesive tape may also have a propensity to stick to other surfaces that it contacts during handling and prior to final placement of the roofing membrane. To alleviate some or all of these issues, a roofing system may include multiple materials or layers that react upon contact. The multiple materials or layers may ensure that the development of high adhesion occurs after the installation of the roofing membrane is complete and not prior to installation, such as during storage or transport. The multiple layers can consist of tapes having different chemical compositions, such as pre-applied adhesive layers that reactively cure together. In other embodiments, the multiple layers may include a combination of a reactive tape and an adhesive material.

Figure 10A:
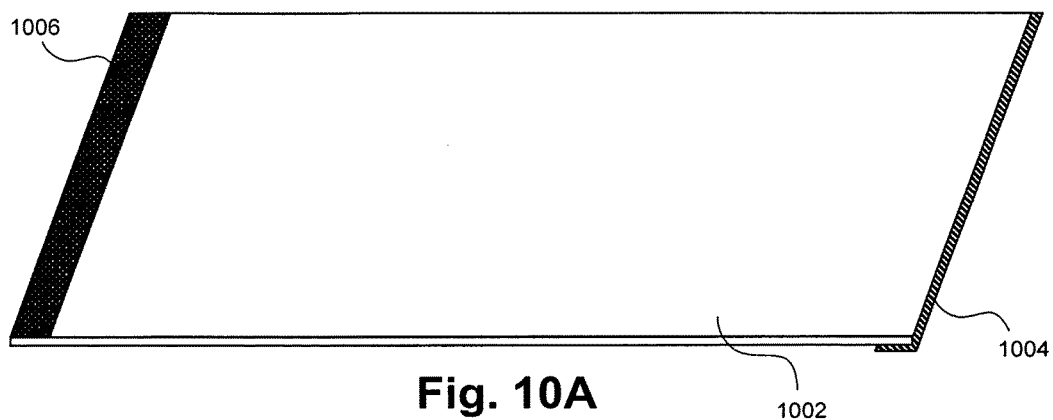
FIGS. 10A-C illustrate a roofing membrane having a reactive material applied to opposite surfaces and opposite faces of the roofing membrane.
Figure 10B:
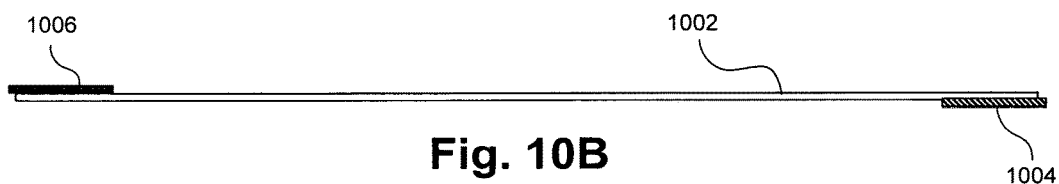
Figure 10C:
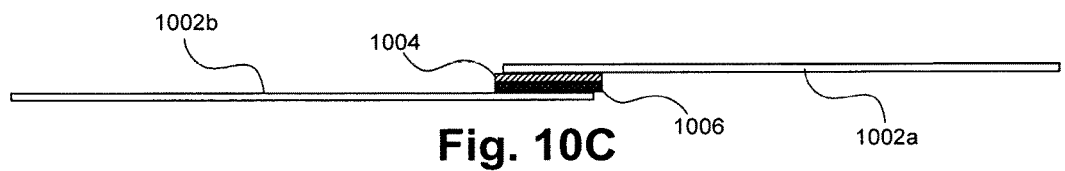

Referring now to FIGS. 10A-C, illustrated is an embodiment of a roofing membrane 1002 having a reactive material that is applied to at least one surface of the roofing membrane 1002. In some embodiments, the reactive material may be applied to opposite surfaces and opposite sides or edges of the roofing membrane 1002 as previously described. In other embodiments, the reactive material may be applied to a single surface (i.e., either top or bottom) and a single side of the roofing membrane, or may be applied to the same surface (i.e., either top or bottom) and opposite sides of the roofing membrane 1002. FIG. 10A illustrates the roofing membrane 1002 having a first reactive material 1006 applied to a top surface and one extreme edge or side of the membrane 1002 and a second reactive material 1004 applied to a bottom surface and an opposite extreme edge or side of the membrane 1004.

The first reactive material 1006 is an "A" part of a chemically reactive two-part cure system while the second reactive material 1004 is a "B" part of the chemically reactive two-part cure system. In other embodiments, the first reactive material 1006 and the second reactive material 1004 may both be either "A" parts or "B" parts of a chemically reactive two-part cure system. In such embodiment, the first reactive material 1006 and second reactive material 1004 may be positioned on the same surface and opposite sides, or opposite surfaces and opposite sides as illustrated. The "A" part and "B" part may be configured to react when they contact one another and not prior to such contact. In some embodiments, the A and B parts may be polymer resins, synthetic resins (e.g., epoxy), natural resins, and the like. The "A" part and "B" part reactive layers or materials may be applied as a tape that is adhesively bonded to the roofing membrane, applied to or soaked in a carrier material that is attached to the roofing membrane, or applied as a liquid directly to the roofing membrane. In a specific embodiment, at least one of the first reactive material 1006 or second reactive material 1004 is applied as a tape. In another embodiment, both the first reactive material 1006 and the second reactive material 1004 are applied as tapes or carriers. In yet another embodiment, the first reactive material 1006 and the second reactive material 1004 are applied in different manners, such as one being applied as a tape or carrier and the other being applied as a liquid.

When a tape or carrier material is used, the tape or carrier material may be offset from an edge or side of the roofing membrane 1002, or substantially aligned therewith as previously described. Exemplary A part and B part materials include: epoxies, urethanes, polyurethanes, polysulfides, acrylics, polyesters, polyureas, silicones, and the like. FIG. 10 B illustrates a side view of the roofing membrane 1002 having the first reactive material 1006 applied to the top surface and one extreme side or edge and the second reactive material 1004 applied to the bottom surface and opposite extreme side or edge.

FIG. 10C illustrates a first roofing membrane 1002a adhesively bonded with a second roofing membrane 1002b. The first roofing membrane 1002a includes a second reactive material 1004 having a B part of a chemically reactive two-part cure system as previously described. The second roofing membrane 1002b includes a first reactive material 1006 having the A part of the chemically reactive two-part cure system. The first and second roofing membranes, 1002a and 1002b, are positioned relative to one another so that the second reactive material 1004 is positioned directly atop and in contact with the first reactive material 1006. Contact between the first and second reactive materials, 1006 and 1004, causes the reactive materials to cure and adhere together. Specifically, contact between the A part and B part of the chemically reactive two-part cure system effects a chemical reaction that adhesively bonds the first and second roofing membranes, 1002a and 1002b, together at the seam. In some instances, the reaction of the A and B part materials may be increased upon application of heat and/or pressure. When either the first reactive material 1006 and/or second reactive material 1004 are applied as tapes or carriers, the reactive material may be offset from a side or edge of the seam between the first and second roofing membranes, 1002a and 1002b, or may be substantially aligned therewith.

In some instances, it may be difficult to roll and/or transport roofing membranes that include pre-applied adhesive tapes as described herein. For example, the pre-applied adhesive tape roofing membranes may not wind-up or kickout smoothly due to an inconsistent thickness across the roofing membrane sheet. These issues may be alleviated by employing a folding orientations that improves the wind-up of the roofing membrane. The folding orientation employed may distribute more material in the thinner sections of the roofing membrane sheet and thereby avoid some of the problems associated with rolling the roofing membrane.

FIG. 11A illustrates one embodiment of a folding orientation that may be employed to alleviate some of the issues associated with rolling the roofing membrane sheet. FIG. 11A illustrates a roofing membrane 1102 having a configuration similar to those described herein. Specifically, the roofing membrane 1102 includes a first material 1104 and a second material 1106 that are attached to opposite extreme sides or edges of the roofing membrane 1102. The first and second materials, 1104 and 1106, may be attached to the same side or surface of the roofing membrane, or may be attached to opposite sides or surfaces of the roofing membrane 1102 as illustrated in FIG. 11A. The first and second materials, 1104 and 1106, are representative of the various materials described herein, including: pre-applied adhesive tapes, mechanical fastening members, reactive materials (e.g., A and/or B part materials), and the like. The first and second materials, 1104 and 1106, may also be representative of other materials that are not described herein. As such, the first and second materials, 1104 and 1106, are not limited to any one particular roofing membrane embodiment.

As illustrated in FIG. 11A, the roofing membrane 1102 is Z-folded 1108 between the first and second materials 1104 and 1106. Specifically, the roofing membrane 1102 is Z-folded 1108 to include three folded layers that "build up" or result in a similar thickness as the roofing membrane 1102 and the first and second materials 1104 and 1106. Stated differently, the roofing membrane 1102 is folded so that the central Z-folded section 1108 has a thickness that is similar to the thickness of one or both sides or edges of the roofing membrane 1102, which includes the thickness of the roofing membrane sheet and the respective first material 1104 or second material 1106. Ideally, the folded central section of the roofing membrane has a thickness that is equivalent to or greater than the thickness of each side or edge. This thicker central section configuration ensures that when the roofing membrane 1102 is stacked with other similar roofing membranes, the stacking pressure is exerted on the central folded section and not on the ends that include the first and second materials, 1104 and 1106. Eliminating or reducing pressure that is exerted on the first and second materials, 1104 and 1106, may help ensure that premature curing or other issues, such as compression of the respective materials, does not occur or is minimized.

In some embodiments, the roofing membrane 1102 is folded so that the folded central section 1108 occurs between the inner edges or sides of the first and second materials 1104 and 1106. Stated differently, the folds of the central section are disposed inside or in-between the first and second materials, 1104 and 1106, so that the folds and roofing membrane sheet do not contact, or minimally contact, the first and second materials 1104 and 1106. This configuration helps ensure that the first and second materials, 1104 and 1106, are free of the central folded section 1108 and that stacking pressure are not transferred to the first and second materials 1104 and 1106.

FIG. 11B illustrates an embodiment of a roofing membrane 1120 that includes a pre-applied tape 1122 that is applied to only a single side of the roofing membrane 1120. The opposite side of the roofing membrane 1120 may not include a tape or other material or may include a material having a negligible thickness, such as a reactive material that is applied as a liquid to the roofing membrane 1120. The application of the pre-applied tape 1122 to a single side of the roofing membrane 1120 may result in an imbalance of the roofing membrane 1120, particularly an imbalance of the thickness of the roofing membrane 1120. To balance the thickness of the roofing membrane 1120, a filler strip or material 1124 may be placed at a side or edge of the roofing membrane 1120 opposite the pre-applied tape 1122. The filler strip 1124 may be applied to the same surface or an opposite surface of the roofing membrane depending on the balance that is desired. The roofing membrane may then be folded as described in FIG. 11A. In some embodiments, the filler strip 1124 may aid in rolling the roofing membrane 1120 out straight, and/or the filler strip 1124 could have an anti-slip or light tack surface that prevents the fold from slipping laterally or wrinkling during winding up. In yet other embodiments, the filler strip 1124 may be composed of membrane and/or tape materials and may be used to patch or flash details on the roofing membrane and/or roof surface. Alternatively, the filler strip 1124 may have a non-stick surface and may be placed strategically to prevent the adhesive tape 1122 from sticking to the wrong surfaces during installation, such as sticking to an adjacent roofing membrane sheet when the roofing membrane is folded back in a butter-fly application.

FIG. 11C illustrates another embodiment of a fold that may be employed for roofing membranes. Specifically, the roofing membrane 1130 in FIG. 11C includes a pre-applied tape 1132 on opposite extreme sides or ends and on the same surface (e.g., top surface). The roofing membrane 1130 is folded roughly centrally so that the two sides or ends are slightly offset from one another, which avoids the pre-applied tapes 1132 from being positioned atop one another. Since the pre-applied tapes 1132 are not positioned atop one another, the folding of the roofing membrane 1130 does not result in a "double-thickness" at the end of the roofing membrane where the pre-applied tapes 1132 are positioned. A filler strip 1124 is inserted inside the folded roofing membrane 1130 to mimic the thickness of the pre-applied tapes 1132. The filler strip 1124 may be positioned at the fold of the roofing membrane 1130 or elsewhere as desired. In some embodiments, the filler strip 1124 may extend from near the fold to adjacent one of the pre-applied tapes 1132. In such embodiments, the filler strip 1124 may be slightly thicker than the pre-applied tapes 1132 so that a majority of a downward force is applied to the filler strip 1124 and not the pre-applied tapes 1132. The thickness of the filler strip 1124 is typically chosen to ensure that tension during wind-up and kickout of the roll is equal on both sides.

According to one embodiment, a method of forming a roofing membrane includes providing a main body of the roofing membrane. The main body has a top surface, a bottom surface positioned opposite the top surface, and four edges that define an outer periphery of the main body such that the main body has a rectangular or square profile. The method also includes applying a first material to the main body so that the first material is positioned toward a first edge thereof and applying a second material to the main body so that the second material is positioned toward a second edge thereof. The first material may extend along a majority of a length of the first edge and the second material may extend along a majority of a length of the second edge. Typically both material extend along substantially all or all of the length of the first edge and second edge respectively. The second edge may be positioned opposite the first edge such that the first and second materials are positioned toward opposite edges of the main body and in some embodiments on opposite surfaces thereof, although the first and second materials may be positioned on the same surface (i.e., either top or bottom).

In some embodiments, at least one of the first material or the second material includes a first reactive material of a chemically reactive two-part cure system that is configured to chemically react upon contact of the first reactive material with a second reactive material of the chemically reactive two-part cure system. In some embodiments, the first material may be or include the first reactive material and the second material may be or include the second reactive material so that the roofing membrane includes both materials of the chemically reactive two-part cure system positioned on opposite edges of the main body. The method may further include applying the first reactive material as a liquid directly to a surface of the roofing membrane. In other embodiments, the method may further include applying the first reactive material as a tape to a surface of the roofing membrane or saturating the first reactive material in a carrier that is attached to the roofing membrane.

In other embodiments, the first material may be or include an adhesive tape that is bonded with the roofing membrane. In such embodiments, the method may additionally include adhesively bonding a mechanical fastening member with a top surface of the adhesive tape. The mechanical fastening member may be configured to receive a mechanical fastener to secure the roofing membrane to a roof surface. In yet other embodiments, the first material may be a mechanical fastening member that is configured to receive a mechanical fastener to secure the roofing membrane to a roof surface. The mechanical fastening member may be coupled with the roofing member prior to transport of the roofing member to an installation site.

In yet other embodiments, the first material may include a pair of adhesive tapes that are bonded to the main body and positioned toward the first edge with a gap existing between the inner sides or edges of the pair of adhesive tapes. The gap may be sized so that a mechanical fastening member may be positioned therein. The mechanical fastening member may be configured to receive a mechanical fastener to secure the roofing membrane to a roof surface.

In some embodiments, the method may additionally include removably securing a releasable liner atop the first material. The releasable liner may include at least one scored or perforated region that is independently removable from a main body of the releasable liner. In such embodiments, the method may also include removing the main body of the releasable liner or the at least one scored or perforated region of the releasable liner from the first material so that either the main body of the releasable liner or the at least one scored or perforated region of the releasable liner remains attached to the first material. The at least one scored or perforated region of the releasable liner may be positioned with respect to the main body of the releasable liner so as to aid in alignment of a mechanical fastening member with the first material. In such embodiments, the method may further include aligning the mechanical fastening member with the first material via the at least one scored or perforated region.

The method may additionally include folding the roofing membrane in a z-configuration with the folded section of the roofing membrane being disposed between the first material and the second material.

Although the figures and the embodiments described are generally directed toward roofing membranes having an adhesive tape or other material applied to opposing sides and opposing surfaces, it should be realized that many variations are possible. For example, in some embodiments, the adhesive tape or other material may be positioned on each edge so that all four edges or sides includes an adhesive tape or other material. In such instances, the adhesive tape or material may be positioned on opposing sides of the roofing membrane in any combination, or may be positioned on the same side. In other embodiments, three of the four sides or edges may include an adhesive tape or other material, which may each be positioned on the same surface or on opposing surface as desired.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A roofing membrane comprising:
   a main body having:
      a top surface;
      a bottom surface positioned opposite the top surface; and
      four edges that define an outer periphery of the main body such that the main body has a rectangular or square profile;
   a first tape or carrier material bonded to the top surface of the main body and positioned toward a first edge thereof, the first tape or carrier material extending along a majority of a length of the first edge; and
   a second tape or carrier material bonded to the bottom surface of the main body and positioned toward a second edge thereof, the second tape or carrier material extending along a majority of a length of the second edge; wherein:
   the second edge is positioned opposite the first edge such that the first and second tape or carrier materials are positioned toward opposite edges of the main body,
   a first reactive material of a chemically reactive two-part cure system is applied to or soaked in the first tape or carrier material;
   a second reactive material of the chemically reactive two-part cure system is applied to or soaked in the second tape or carrier material; and
   the first reactive material is configured to chemically react upon contact with the second reactive material and is further configured to not chemically react prior to contact with the second reactive material.

2. The roofing membrane of claim 1, further comprising a first membrane material releasably coupled with a top surface of the first reactive material and a second membrane material releasably coupled with a top surface of the second reactive material.

3. The roofing membrane of claim 1, wherein the first reactive material and the second reactive material are resins.

4. The roofing membrane of claim 1, wherein the first tape or carrier material is bonded to the main body such that an edge of the first tape or carrier material extends outwardly of the outer periphery from an edge of the main body by between about $1/16$ and $1/4$ inch.

5. A roof membrane system comprising:
   a first membrane positioned atop the roof, the first membrane having a distal edge that includes a tape or carrier material on a top surface thereof, the tape or carrier material extending along a majority of a length of the distal edge, wherein a of a chemically reactive two-part cure system is applied to or soaked in the tape or carrier material of the first membrane; and
   a second membrane positioned atop the roof and adjacent the first membrane so that a proximal edge of the second membrane overlaps with and is bonded to the distal edge of the first membrane, the proximal edge of the second membrane including a tape or carrier material on a bottom surface thereof, the tape or carrier material extending along a majority of a length of the proximal edge, wherein a second reactive material of the chemically reactive two-part cure system is applied to or soaked in the tape or carrier material of the second membrane;
   wherein the first reactive material and the second reactive material are configured to chemically react and cure upon contact with one another to bond the distal edge of the first membrane to the proximal edge of the second membrane, and wherein the first reactive material and the second reactive material are configured to not chemically react prior to contact with one another.

6. The roof membrane system of claim 5, further comprising a first membrane material releasably coupled with a top surface of the first reactive material and a second membrane material releasably coupled with a top surface of the second reactive material.

7. The roof membrane system of claim 5, wherein the first reactive material and the second reactive material are resins.

8. A roofing membrane comprising:
   a main body having:
      a top surface;
      a bottom surface positioned opposite the top surface; and
      four edges that define an outer periphery of the main body such that the main body has a rectangular or square profile;
   a first tape or carrier material bonded to the main body and positioned toward a first edge thereof, the first tape or carrier material extending along a majority of a length of the first edge, wherein a first reactive material of a chemically reactive two-part cure system is applied to or soaked in the first tape or carrier material; and
   a second reactive material of the chemically reactive two-part cure system bonded to the main body and positioned toward a second edge thereof, the second reactive material extending along a majority of a length of the second edge; wherein:
   the second edge is positioned opposite the first edge such that the first and second materials are positioned toward opposite edges of the main body;
   wherein the first tape or carrier material is bonded to the main body such that an edge of the first tape or carrier material extends outwardly of the outer periphery from an edge of the main body by between about $1/16$ and $1/4$ inch; and
   the first reactive material is configured to chemically react upon contact with the second reactive material and is further configured to not chemically react prior to contact with the second reactive material.

9. The roofing membrane of claim 8, wherein the second reactive material is applied as a liquid directly to the roofing membrane surface.

10. The roofing membrane of claim 8, wherein the second reactive material is applied to or soaked in a second tape or carrier material that is bonded to the main body.

11. The roofing membrane of claim 8, further comprising a first membrane material releasably coupled with a top surface of the first reactive material and a second membrane material releasably coupled with a top surface of the second reactive material.

12. The roofing membrane of claim 8, wherein the first reactive material and the second reactive material are resins.

* * * * *